United States Patent [19]
Zur

[11] Patent Number: 5,383,599
[45] Date of Patent: Jan. 24, 1995

[54] AGRICULTURAL AIR/LIQUID SPRAYER HAVING AN INFLATABLE SPRAYING SLEEVE

[76] Inventor: David Zur, 68 Hashomer Street, Zichron Yaakov, Israel

[21] Appl. No.: 996,726

[22] Filed: Dec. 24, 1992

[51] Int. Cl.⁶ .................. B05B 7/24; A01C 23/00
[52] U.S. Cl. .................. 239/77; 239/172; 239/175
[58] Field of Search .......... 239/77, 78, 654, 655, 239/172, 175, 146

[56] References Cited

U.S. PATENT DOCUMENTS

| | | | |
|---|---|---|---|
| 2,687,593 | 8/1954 | Edwards | 239/655 |
| 2,925,222 | 2/1960 | Spreng | 239/77 |
| 3,501,096 | 3/1970 | Stilwell et al. | 239/77 |
| 3,708,126 | 1/1973 | De Kinkelder | 239/78 |
| 5,098,018 | 3/1992 | Hadar et al. | 239/77 |
| 5,251,818 | 10/1993 | Manor et al. | 239/77 |

*Primary Examiner*—Karen B. Merritt
*Attorney, Agent, or Firm*—Notaro & Michalos

[57] ABSTRACT

A spraying apparatus to be used primarily in orchards or any other groves where the trees are of considerable height. The apparatus comprises a chassis on which is mounted an air blower attached to a vertical inflatable sleeve. The sleeve is provided with a longitudinal row of apparatus and spraying nozzle adjacent to said apertures. Flexible conduits connect said nozzle to a container for liquids.

9 Claims, 6 Drawing Sheets

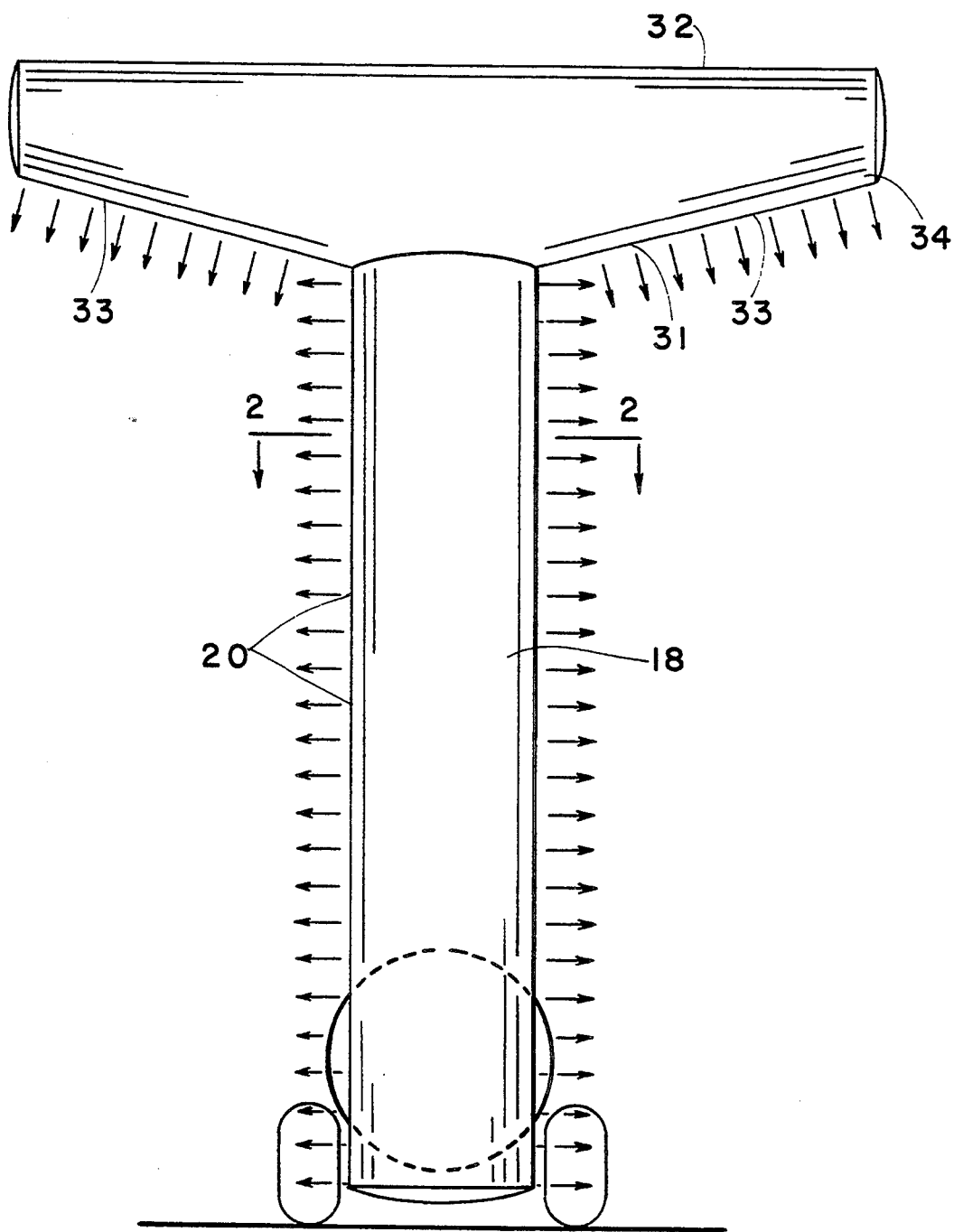
FIG. IB

AGRICULTURAL AIR/LIQUID SPRAYER HAVING AN INFLATABLE SPRAYING SLEEVE

FIELD OF THE INVENTION

The present invention relates to spraying apparatus in general and in particular to mechanised agricultural sprayers normally installed on, or towed by, a tractor or a like vehicle.

BACKGROUND OF THE INVENTION

The application of fertilizers, weedkillers, fungicides and pesticides is vital to the enchancement of crop growth and to the operation of systems of weed and pest control. Where this application is by mechanical sprayer, it is most common that the apparatus used will comprise a very long thin boom-supported centrally hinged metal pipe which, when in operation, is parallel to the ground surface and is attached to a tank containing liquid, itself either mounted on, or towed by, a tractor.

The liquid is sprayed through apertures or nozzles situated in the underneath of the pipe. Although a cloud of droplets trails the apparatus during operation in such a way that the application may be considered to be thorough, the usefulness of the above-described apparatus is limited due to the fact that the point of application is near to ground level and thus it is impractical to use the above described apparatus in the treatment of tall crops and trees. Indeed, at the present time the most thorough method of spraying trees is by manual application with a hand held spray; this method is obviously very costly in man-hours.

SUMMARY OF THE INVENTION

It is an object of the present invention to provide a device which, when used in conjunction with already existing apparatus, will enable highly efficient spraying, typically of various types of agricultural produce, to be carried out in circumstances that until now have not permitted the use of mechanized spraying apparatus.

There is thus provided in accordance with the present invention spraying apparatus comprising a base, a spraying sleeve having a non-horizontal portion and apertures and mounted on the base, a source of pressurized air mounted on the base, means for coupling the spraying sleeve with the pressurized air source mounted on the base, at least one liquid container having an outlet and mounted on the base, and a plurality of liquid paths between the container outlet and points adjacent to the sleeve apertures.

In preferred embodiments of the present invention, the source of pressurized air comprises an air blower, and each of the liquid paths comprises a conduit, preferably terminating in a spray nozzle at a point adjacent to a sleeve aperture.

In one preferred embodiment of the present invention, the spraying sleeve comprises at least one elongated hollow prismatic member which is columnar in shape and is characterized by the existence of a contiguous hollow space through the sleeve as a whole and by all ends of the at least one member being closed unless otherwise implied or stated.

The said sleeve is further characterised by the apertures and spray nozzles being located, preferably adjacent to one another, along the lengths of the at least one member.

During operation of the spraying apparatus the source of pressurized air is activated to supply air at high pressure to the spraying sleeve, thus producing a high velocity air stream through each of the apertures.

At a preselected moment, liquid at low pressure is supplied to each of the nozzles via conduits leading from the liquid container, the liquid exiting the nozzles in a stream the direction of which is preferably transverse to that of the air stream. The stream of liquid then impinges on the air stream and is atomized and dispersed in an outward direction.

In an additional preferred embodiment of the present invention, the sleeve comprises a single primary elongated hollow columnar member and one or more secondary elongated hollow prismatic members joined to one end of said primary member.

In a further embodiment of the present invention, the sleeve comprises a single primary elongated hollow columnar member, a plurality of secondary elongated hollow columnar members parallel to the primary member, and one or more tertiary elongated hollow prismatic members joined at right angles to the primary and secondary members.

In a preferred embodiment of the present invention, a single secondary member comprises a single elongated hollow prismatic member joined at right angles to the above mentioned primary member such that the configuration of the sleeve is generally that of a T, with the optional presence of spraying nozzles on the underside of the secondary member.

In an additional but similar preferred embodiment of the present invention, the secondary member may comprise two flat ended elongated hollow prismatic members joined to the primary member such that the configuration of the sleeve is generally that of a Y. An additional feature of this embodiment is that spray nozzles may be located on the flat ends of the secondary member.

It is an important feature of the preferred embodiments of the present invention that the columnar and prismatic members are cylindrical.

It is an additional important feature of preferred embodiments of the present invention that the spray nozzles are arranged in straight lines.

A further important feature of preferred embodiments of the present invention is that the sleeves are constructed from material such that they are inflatable.

In preferred embodiments of the present invention, the above mentioned support means for the sleeve comprises a chassis which may be towable or self-propelled.

A further important feature of the present invention is that the sleeve may be positioned at any preselected inclination relative to the support means, although the sleeve's relative inclination will typically be substantially perpendicular.

BRIEF DESCRIPTION OF THE DRAWINGS

The invention will be more fully understood and appreciated from the following detailed description taken in conjunction with the drawings in which:

FIG. 1B is a rear view of the spraying apparatus shown in FIG. 1A.

DETAILED DESCRIPTION OF THE INVENTION

Figure 1A:
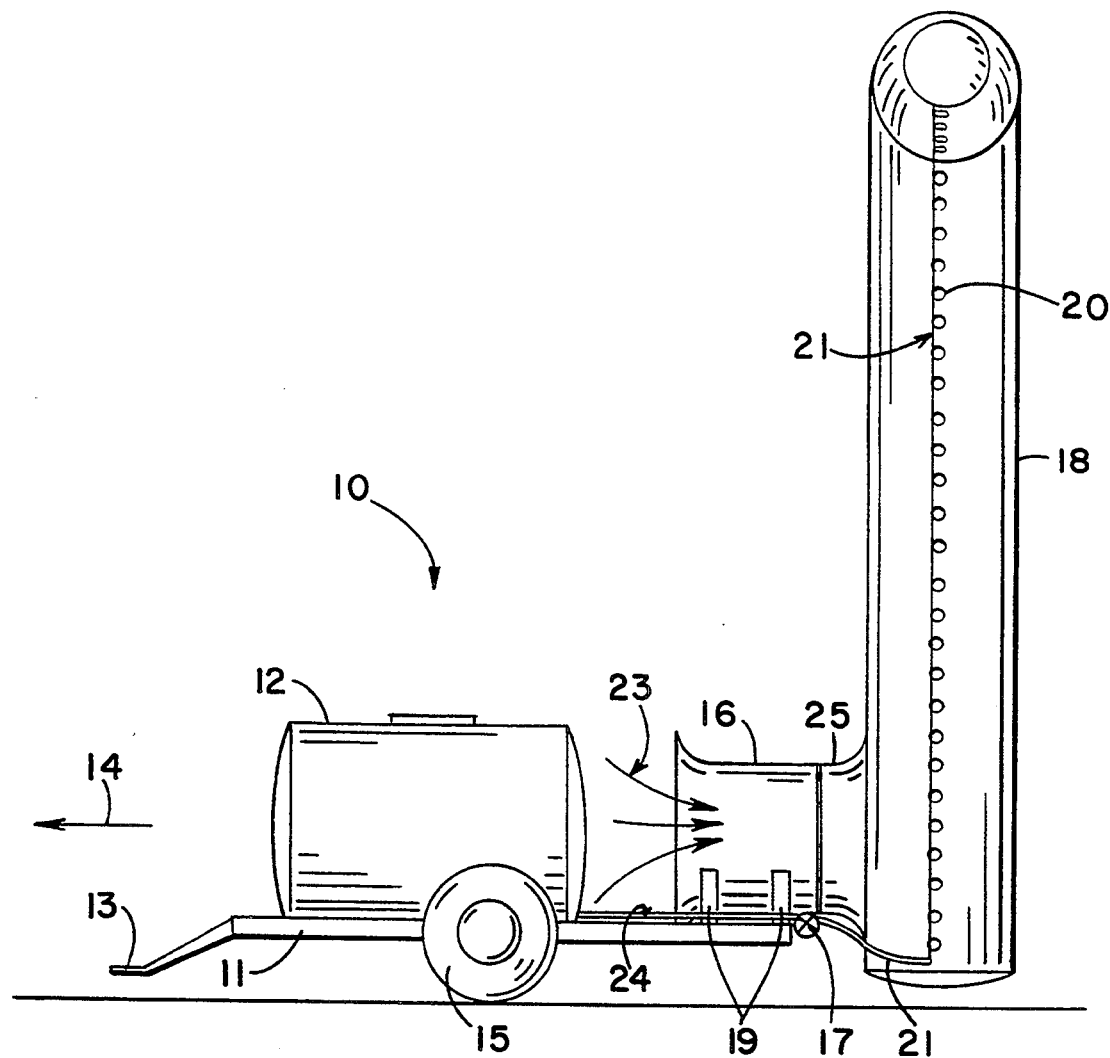
FIG. 1A is a side view illustration of spraying apparatus comprising a generally T-shaped embodiment of the present invention.
Figure 2:
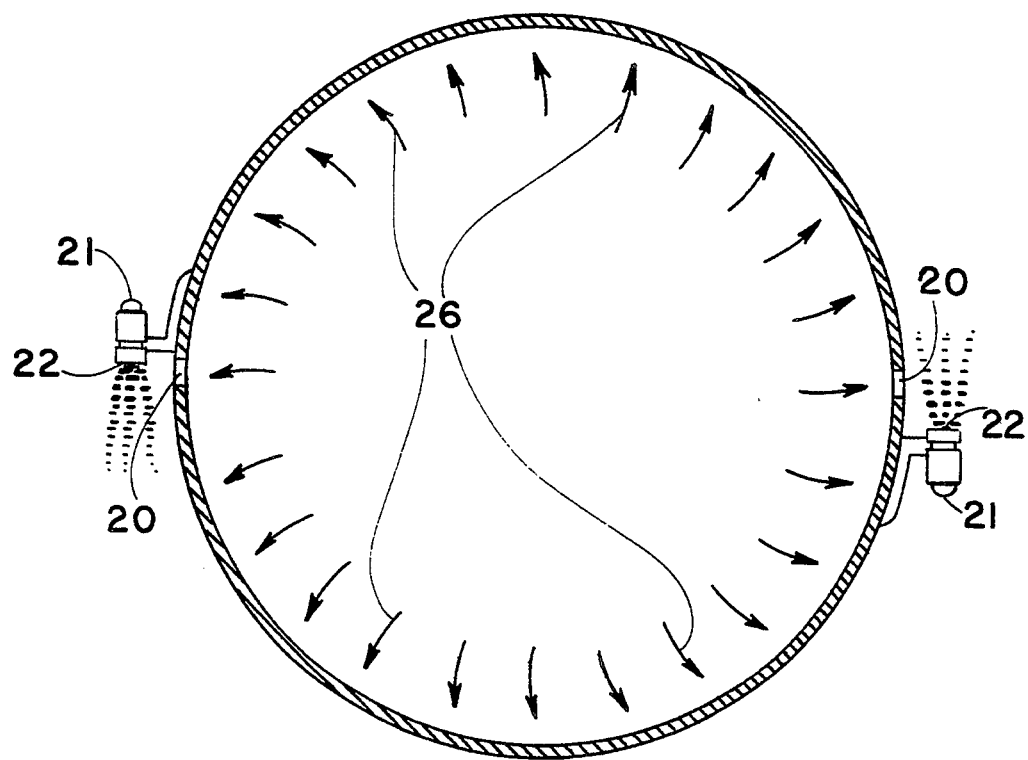
FIG. 2 is a sectional view of the sleeve taken along line II—II of FIG. 1B.

Referring now to FIGS. 1A, 1B, and 2, there is shown a spraying apparatus constructed and operative in accordance with an embodiment of the present invention. With reference now to FIGS. 1A, 1B and 2 there is shown a spraying apparatus 10 comprising a chassis 11 to be attached at forward location 13 to a tractor and moving on wheels in the shown direction 14. Situated on the chassis 11 is a tank 12 which at the start of spraying operations is normally full of the liquid to be sprayed, typically fertilizer, fungicide, insecticide or weed killer. At the rear end of chassis 11, located in seatings 19, is an air blower 16. A sleeve inlet 25 of a sleeve 18 is attached to the outlet of airblower 16, the inlet 25 being constructed of non-flexible material.

During spraying, the apparatus is pulled in the direction as indicated by arrow 14. The sleeve 18, here shown in a generally T-shaped embodiment, is inflated by air which is introduced as indicated by arrows 23 into blower 16 and which outlets into the sleeve inlet 25 and then into the sleeve 18. Once the sleeve 18 is inflated, its shape is maintained by pressure exerted internally on the member walls as shown by arrows 26$i$. Air exits from the sleeve 18 through apertures 20 when the pressure inside the sleeve 18 exceeds a particular pressure which from this point will be referred to as 'critical pressure'.

At a preselected moment, the liquid in tank 12 is introduced via a first conduit 24 and a valve 17 into a set of second conduits 21, each of which is connected to a spray nozzle 22. As the pressure inside the sleeve 18 is maintained above critical pressure, the liquid is expelled from nozzles 22 and becomes atomized on exit thereof by the high velocity air current passing simultaneously through apertures 20. The resulting spray immediately exits in a direction outward and perpendicular to the movement of the spraying apparatus 10.

The spraying apparatus 10, as shown in FIGS. 1A and 1B comprises a vertical cylindrical sleeve 18 with side apertures 20 and with the addition of a top member 34, shown here as horizontal, where the top edge 32 is perpendicular to the vertical sleeve 18.

The bottom edge 33 of the top member 34 is at a small angle to the horizontal, such that the said top member 34 may be said to comprise two hollow truncated right cones, each of which has been cut down the middle, placed base to base such that the top edge 32 is a straight and horizontal line. The shown configuration of the top member 34 such that the cylinder increases in diameter towards the middle as shown is advantageous in order to ensure structural stability of the said member. Outlets 31 situated on the bottom edge 33 of the top member 34 are preferably evenly spaced one from another and such that their preferred orientation is perpendicular to that edge 33.

The configuration of the apparatus as shown in FIGS. 1A and 1B would be suitable for spraying rows of tall plants or trees such as apple trees.

Figure 3:
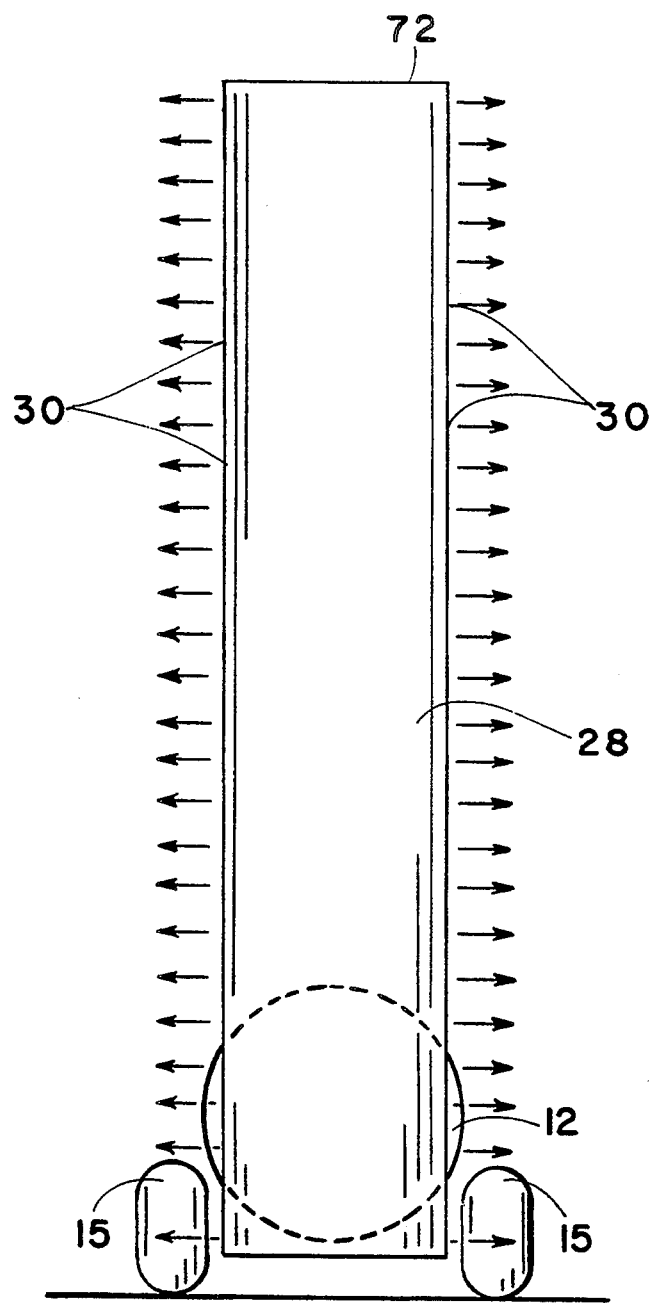
FIG. 3 is a rear view illustration of spraying apparatus comprising a single columned embodiment of the present invention.

Referring now to FIG. 3, there is shown an embodiment of the present invention wherein the spraying sleeve comprises a single cylindrical and substantially vertical member 28 with a flat circular top 72.

Figure 4:
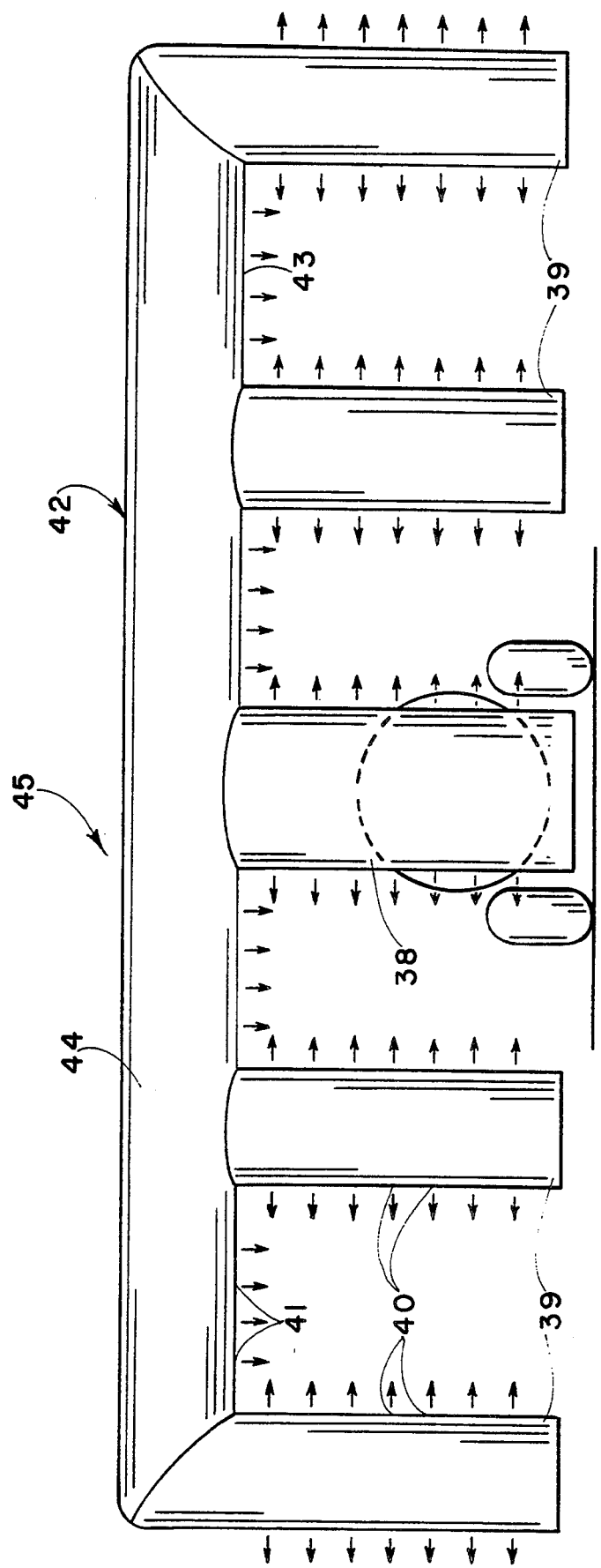
FIG. 4 is a rear view of an additional embodiment of the present invention comprising one horizontal member and a plurality of preferably vertical members.

Referring now to FIG. 4, there is shown spraying apparatus employing an additional preferred embodiment of the invention. The sleeve 45 comprises a preferably horizontal member 44 with parallel edges 42 and 43 respectively with a plurality of evenly spaced preferably vertical members 38 and 39, the outer vertical members 39 characterized by having a smaller diameter than the central member 38.

As with previous embodiments of the invention the outlets 40 on vertical members 38 and 39 are preferably evenly spaced and their preferred orientation is horizontal to the ground and perpendicular to the direction of movement of the apparatus. The outlets 41 on the bottom edge 43 of the horizontal member 44 are also preferably evenly spaced and their preferred orientation is vertically downwards.

This shown preferred embodiment would be particularly suitable where plants are planted in closely spaced rows making spraying difficult, but with an access path provided between groups of rows as, by way of example, with grapevines.

Figure 5:
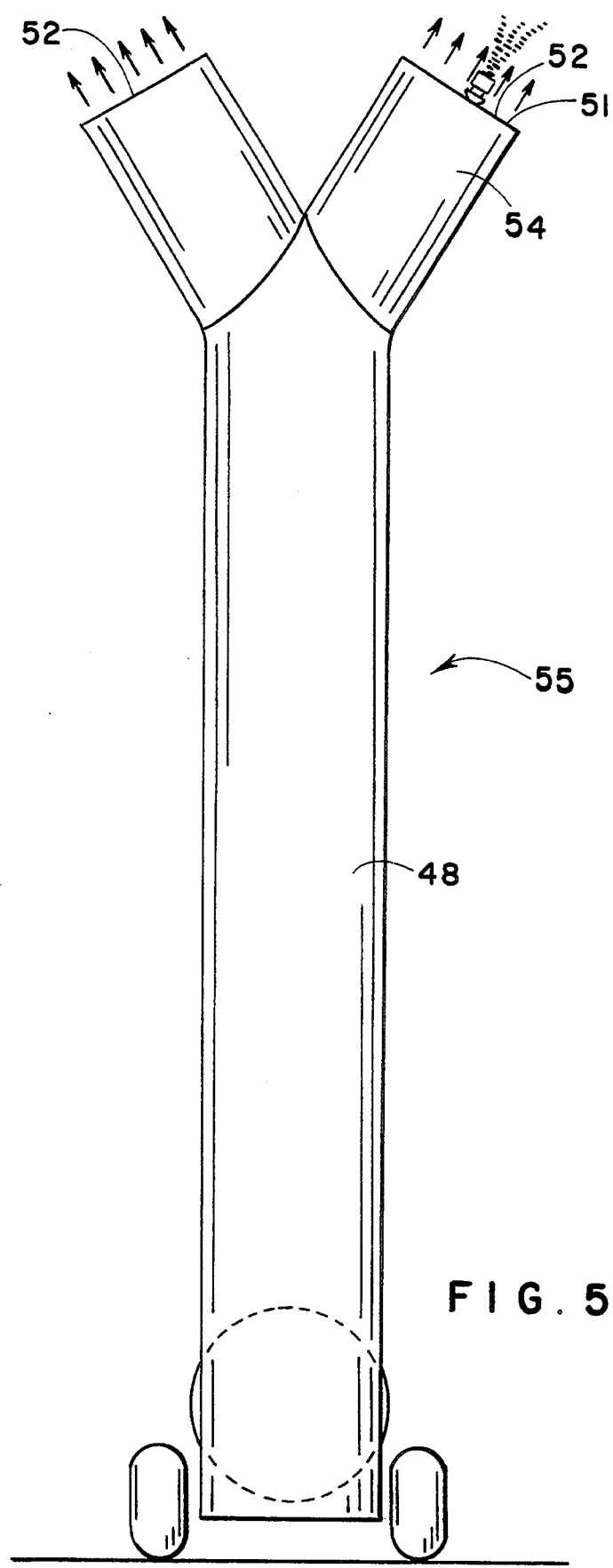
FIG. 5 is a rear view of the spraying apparatus comprising a generally Y-shaped embodiment of the present invention.

A final preferred embodiment is that shown in FIG. 5 where the sleeve 55 comprises vertical member 48 and which splits at its top into two separate diagonal members 54 forming a generally 'Y' shaped configuration. In this preferred embodiment where the members used are cylindrical, located at the ends of and perpendicular to the length of diagonal members 54 are surfaces 52 in which are preferably evenly spaced outlets 51. This preferred embodiment would be particularly suitable for the spraying of trees in orchards where at present the method of spraying is manual and very expensive in man-hours.

With further reference to FIGS. 1A, 1B, 3, 4 and 5, it should be noted that although all the preferred embodiments described employ members substantially cylindrical in shape, any elongated hollow prismatic member may be suitable.

It should be further noted that all of the above-described sleeves and additionally any variations thereof consist of entirely hollow members such that a sleeve may be deemed to comprise, among its other constituents, a contiguous hollow space such that air flow therethrough and between members is substantially unimpeded.

It will be appreciated by those skilled in the art that the invention is not limited to what has been shown and described hereinabove merely by way of example. Rather the scope of the invention is limited solely by the claims which follow:

I claim:

1. A spraying apparatus comprising:
   a chassis;
   an air blower mounted on the chassis;
   a substantially vertical spraying sleeve attached to the air blower, the spraying sleeve having at least three apertures vertically spaced along a length of the sleeve and at least three spraying nozzles, one of said at least three spraying nozzles is paired with, and mounted adjacent to, a corresponding one of said at least three apertures;

a liquid container mounted on the chassis for providing a spraying liquid;

a plurality of conduits connected to the liquid container and the spraying nozzles; and the air blower supplying air at a high pressure to the spraying sleeve for producing a high velocity air stream through each aperture and the liquid container supplying the spraying liquid to the spraying nozzles via the conduits at a low pressure, the spraying liquid exiting from the spraying nozzles in a spray stream transverse to the air stream.

2. The spraying apparatus according to claim 1, wherein the spraying sleeve comprises at least one elongated hollow columnar member having closed ends, the columnar member having an interior contiguous hollow space between the ends.

3. The spraying apparatus according to claim 1, wherein the spraying sleeve comprises a primary elongated hollow columnar member and at least one secondary elongated hollow prismatic member joined to one end of the primary member.

4. The spraying apparatus according to claim 3, wherein at least one secondary member is parallel to the primary member and including at least one tertiary elongated hollow prismatic member joined at a right angle to the secondary member.

5. The spraying apparatus according to claim 3, wherein at least one secondary member is joined to the primary member at a right angle in a T-shaped configuration.

6. The spraying apparatus according to claim 3, including at least one secondary member having a plurality of apertures and a plurality of spraying nozzles located at an underside of at least one secondary member.

7. The spraying apparatus according to claim 3, wherein the primary member and at least one secondary member are cylindrical.

8. The spraying apparatus according to claim 1, wherein the spraying sleeve comprises an inflatable material.

9. The spraying apparatus according to claim 1, wherein the chassis is towable.

* * * * *